United States Patent
Babin et al.

(10) Patent No.: US 6,375,086 B1
(45) Date of Patent: Apr. 23, 2002

(54) MODULATING REFRIGERANT FLOW THROUGH A MOTORIZED EXPANSION VALVE

(75) Inventors: Christopher J. Babin, Sterling Heights; Timothy J. Green, Holly, both of MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/918,113

(22) Filed: Jul. 30, 2001

(51) Int. Cl.$^7$ ................................................ F25B 41/04
(52) U.S. Cl. .................. 236/92 B; 62/225; 251/129.11
(58) Field of Search ................. 62/224, 225; 236/92 B, 236/84; 251/129.11, 129.12

(56) References Cited

U.S. PATENT DOCUMENTS

| | | | | |
|---|---|---|---|---|
| 3,478,534 A | * | 11/1969 | Matthies | 236/92 B |
| 3,488,030 A | * | 1/1970 | Hulme et al. | 251/129.05 |
| 4,372,486 A | * | 2/1983 | Tomioka et al. | 137/312 |
| 4,381,747 A | * | 5/1983 | Kobayashi et al. | 123/179.16 |
| 4,832,311 A | * | 5/1989 | Kimura | 251/118 |
| 4,848,652 A | * | 7/1989 | Kennedy | 236/34.5 |
| 4,911,404 A | * | 3/1990 | Dorste et al. | 251/129.08 |
| 5,364,066 A | * | 11/1994 | Dorste et al. | 251/122 |
| 5,749,350 A | | 5/1998 | Bender | 123/571 |
| 5,832,944 A | | 11/1998 | Lindner | 137/1 |
| 6,003,535 A | | 12/1999 | Ollivier | 137/15 |

* cited by examiner

Primary Examiner—William E. Tapolcai
(74) Attorney, Agent, or Firm—Roger A. Johnston

(57) ABSTRACT

A motorized refrigerant valve has a spool axially moveable in a valving bore in a valve body for controlling flow from a high pressure inlet for expansion and discharge at substantially reduced pressure to an outlet in the valve body. A ball screw is provided on the remote end of the spool and the ball screw is driven by a rotating shaft of a stepper motor attached to the valve body to provide fine resolution for linear movement of the spool in the valving passage. A separate isolated passage through the valve body is connected to receive evaporator discharge flow and has a thermistor sensing temperature therein and provides a temperature signal to an electronic controller for providing a driver signal to the stepper motor. The stepper motor and ball screw drive to the spool provide the desired modulation of refrigerant flow in response to the signal from the controller.

28 Claims, 1 Drawing Sheet

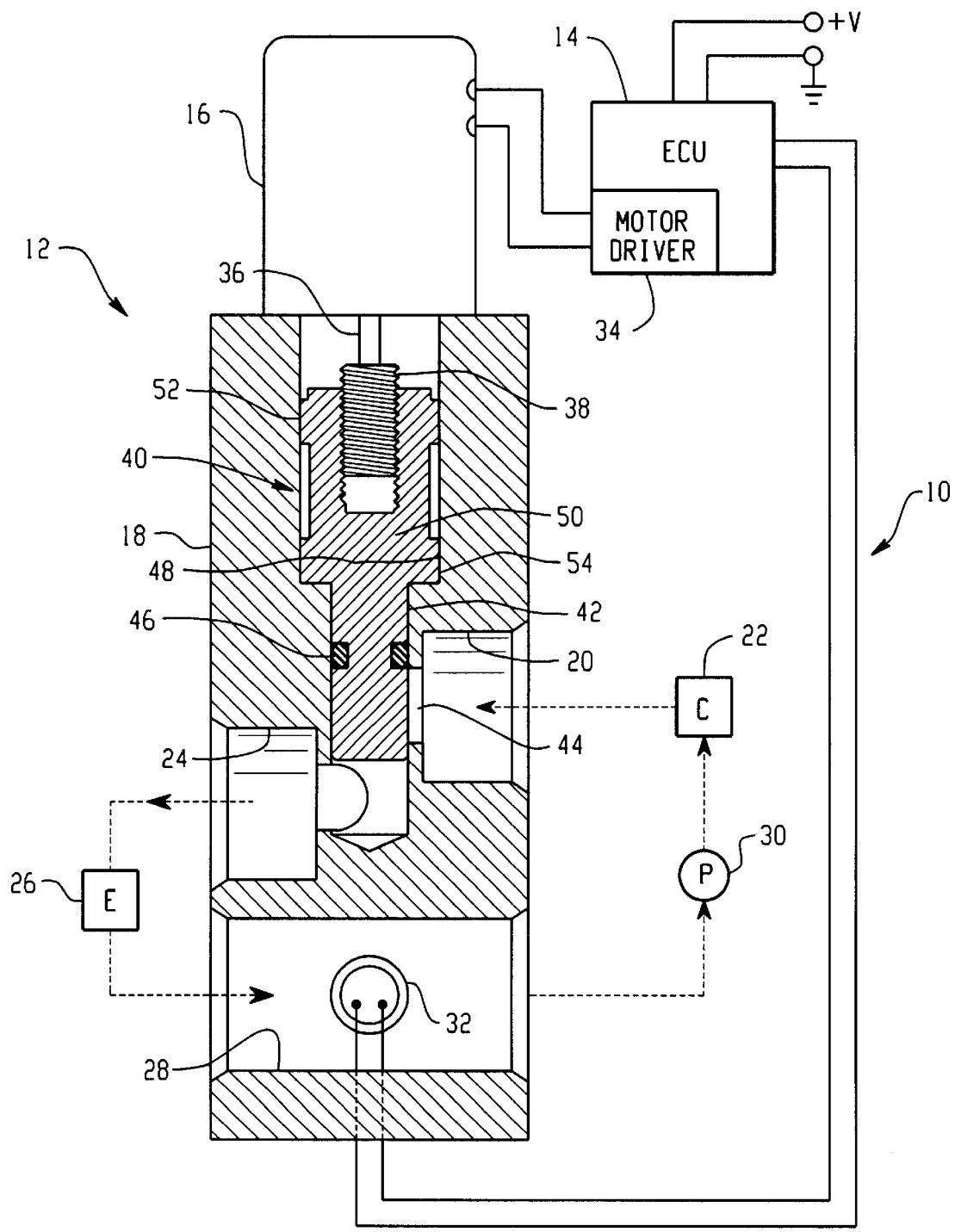

MODULATING REFRIGERANT FLOW THROUGH A MOTORIZED EXPANSION VALVE

BACKGROUND OF THE INVENTION

The present invention relates to refrigerant expansion valves and particularly valves employed for controlling flow of high pressure refrigerant from a condenser and expansion to a lower pressure and flow to an evaporator and is particularly suitable for such applications as motor vehicle passenger compartment air conditioning systems. Heretofore, refrigerant expansion valves employed for vehicle passenger compartment air conditioning have utilized either a fluid filled temperature responsive capsule for moving the expansion valve in response to temperature changes in the fluid in the capsule; or, the valves have employed a solenoid operator for linearly moving a poppet with respect to a valve seat for controlling flow through the valve high pressure inlet to the outlet at a substantially reduced pressure. Electrically operated valves are deemed preferable in motor vehicle passenger compartment air conditioning systems because the electronic controller provides more rapid response for the system.

However, known solenoid operated refrigerant expansion valves have proven to be somewhat unstable and difficult to modulate because a small amount of movement of the poppet results in a substantial change in flow; and, it is extremely difficult to provide fine resolution for the control of movement of a solenoid armature in order to achieve the desired modulation of the refrigerant flow from the valve inlet and across the valve seat to the valve outlet.

It has therefore been desired to provide a way or means of electrically operating a refrigerant expansion valve particularly for such valves employed in an air conditioning system for a motor vehicle passenger compartment in a manner which yields fine resolution of the flow and is relatively inexpensive to manufacture and is sufficiently robust for the environment of such applications.

BRIEF SUMMARY OF THE INVENTION

The present invention provides a servo motor operated refrigerant expansion valve having a rotary motor, such as a stepper motor, mounted directly to the valve body with the motor shaft linearly moving a valve spool with a ball screw connection from the rotating motor shaft to the spool. The spool is slidably sealed in a valving bore and moveable therein with respect to an inlet and outlet port staggered along the valving bore. The valve body contains a separate sensing passage which is adapted for connection to receive flow therethrough from the evaporator returning to the compressor inlet; and, a temperature sensor, preferably a thermistor, is disposed in the sensing passage and connected to provide an electrical temperature signal indicative of refrigerant temperature to an electronic control unit which provides a drive signal for the valve motor.

The present invention thus provides a fine resolution of movement of the spool in the valving bore for modulating refrigerant flow between the inlet and the outlet of the valve. In a typical refrigeration system, the valve inlet is connected to receive the high pressure flow from the condenser and the valve outlet discharges to the evaporator inlet at a substantially reduced pressure.

BRIEF DESCRIPTION OF THE DRAWINGS

The sole drawing of the invention is a cross-section taken through the plane of symmetry of the valve of the present invention and schematically shows the valve connected in a refrigeration system.

DETAILED DESCRIPTION OF THE INVENTION

Referring to the drawing, a refrigeration system is indicated generally at 10 and includes a motorized expansion valve assembly indicated generally at 12 and an electronic controller (ECU) 14. The ECU is electrically connected to a motor 16 mounted on a valve body 18 having a high pressure inlet 20 connected to receive pressurized flow from a condenser 22. The valve discharges at its outlet 24 which is connected to the inlet of an evaporator 26. The outlet of the evaporator 26 is connected to discharge through a separate sensing passage 28 provided in the valve block to the inlet of a compressor 30.

A temperature sensor 32, preferably in the form of a thermistor, is disposed in the sensing passage 28 and is connected to provide electrical inputs to the ECU 14. It will be understood that the ECU includes a suitable system algorithm and provides an electrical signal output through a motor driver 34 to the motor 16.

In the presently preferred practice of the invention the motor 16 is a stepper motor having a rotating output shaft 36 which is connected through a ball screw drive 38 to one end of a spool indicated generally at 40. However, a continuously rotating motor may also be employed.

In the presently preferred practice of the invention, the spool 40 has a reduced diameter portion 42 slidably disposed in closely fitting arrangement in a valving bore 44 formed in the body 18. Valving bore 40 communicates with the inlet 20 and outlet 24 which are located in axially staggered arrangement therealong. The spool is sealed in bore 44 above the inlet port 20 by a suitable seal ring 46 disposed in a groove on the spool for sliding contact with the bore 44.

The valving bore 44 communicates at its upper end with an enlarged diameter counterbore 48 which opens to the upper end of the block 18. The spool 40 has an enlarged diameter portion 50 slidably guided in the bore 48 by an axially spaced pair of annular lands 52, 54 provided on the upper portion 50 of the spool for guiding the spool in the counterbore under the driving loads of the ball screw 38.

The motorized ball screw drive for the spool 40 of the present invention provides fine resolution of movement of the valving portion 42 of the spool for control of the flow from the inlet 20 to the outlet 24 of the valve block. The refrigerant temperature signal from the thermistor 32 inputted to the ECU 14 thus provides "closed loop" type of control for the system.

The ball screw connection and the spool arrangement within the valve body 18, provide a relatively high degree of sensitivity and control of the refrigerant flow when the valve is employed in a system such as the system 10.

The valve arrangement of the present invention provides fine resolution for modulation of refrigerant flow in a manner which is economical to manufacture and is robust and thus competitive for automotive air conditioning system applications.

Although the invention has hereinabove been described with respect to the illustrated embodiments, it will be understood that the invention is capable of modification and variation and is limited only by the following claims.

What is claimed is:

1. An electrically operated valve assembly for controlling flow of refrigerant in a refrigeration system comprising:

(a) a valve body defining an inlet port and outlet port and a valving bore communicating with the inlet port and the outlet port;
(b) a spool disposed in the valving bore and moveable therein for modulating flow between the inlet port and outlet port;
(c) a screw engaging said spool and operative upon rotation to effect said movement of said spool;
(d) a motor attached to the valve body and connected upon energization driving said screw;
(e) a sensing passage formed through the body in spaced relationship to said inlet and outlet ports and the valving chamber; and,
a temperature sensor disposed in said sensing passage and operative to provide an electrical signal indicative of the temperature sensed therein.

2. The assembly defined in claim 1, wherein said temperature sensor comprises a thermistor.

3. The assembly defined in claim 1, wherein said spool includes an annular resilient seal axially slidable in said valving bore.

4. The assembly defined in claim 1, wherein said valve body is a one piece member.

5. The assembly defined in claim 1, wherein said valving bore includes a counter bore having a portion of said spool slidably received therein and said motor is attached at one end of said counter bore.

6. The assembly defined in claim 1, wherein said screw includes a ball screw.

7. The assembly defined in claim 1, wherein said sensing passage is fluidically isolated from said inlet, outlet and valving chamber.

8. The assembly defined in claim 1, wherein said bore includes a counterbore and the spool includes a relatively small diameter portion slidably received in the valving bore and a larger diameter portion slidably received in the counterbore.

9. The assembly defined in claim 8, wherein said larger diameter portion has said screw engaged therewith.

10. The assembly defined in claim 9, wherein s aid screw includes a ball screw.

11. The assembly defined in claim 8, wherein said larger diameter portion includes a pair of annular lands axially spaced thereon for slidably guiding the spool in the counterbore.

12. A method of making a servo operated refrigerant valve comprising:
(a) providing a valve body and forming a valving bore therein and forming an inlet port and an outlet port communicating with the valving bore;
(b) disposing a moveable valve spool in said bore for controlling flow between the inlet and outlet port;
(c) engaging a ball screw with said spool and attaching a motor to the body and connecting the motor for driving the ball screw; and,
(d) forming a through passage in the body spaced from the inlet and outlet ports and disposing a temperature sensor in the through passage.

13. The method defined in claim 12, wherein the step of disposing a temperature sensor includes disposing a thermistor.

14. The method defined in claim 12, wherein the step of disposing a motor includes disposing a stepper motor.

15. The method defined in claim 12, wherein the step of forming a valving bore includes forming a counter bore and slidably guiding said spool in said counter bore.

16. The method defined in claim 12, wherein the step of attaching a motor includes disposing a motor over one end of said counter bore.

17. The method defined in claim 12, wherein the step of disposing a motor includes extending the motor shaft into said counter bore.

18. A system for modulating refrigerant expansion flow from a condenser to an evaporator and to-a compressor return comprising:
(a) a valve body having an inlet connected for receiving flow from the condenser, an outlet connected for discharging flow to the evaporator and a valving bore communicating with the inlet and outlet;
(b) a spool slidably received in the valving bore and axially moveable therein for controlling flow between the inlet and outlet;
(c) a motor disposed on the valve body and having an output shaft with a screw thereon, with the screw rotatably engaging the spool for, upon energization of the motor effecting the movement of the spool;
(d) a sensing passage formed through the block and connected to receive flow at one end from the evaporator and to discharge flow at an end opposite the one end to a pump return;
(e) a temperature sensor disposed in the sensing passage and an electronic control unit receiving a signal from the temperature sensor, the electronic control unit connected to the motor and operative for generating a motor driven signal and for controlling the motor for modulating the spool position in response to changes in the temperature signal from the sensor.

19. The system defined in claim 18, wherein said screw includes a ball screw.

20. The system defined in claim 18, wherein said spool includes a pair of spaced lands for guiding said sliding movement of said spool in said valving bore.

21. The system defined in claim 18, wherein said temperature sensor comprises a thermistor.

22. The system defined in claim 18, wherein said sensing passage is isolated from said inlet, outlet and valving bore.

23. The system defined in claim 18, wherein said spool has a stepped configuration with the portion having the smaller transverse section disposed in the valving bore and the portion having the larger transverse section connected with the screw.

24. The system defined in claim 18, wherein said spool has a portion thereof slidably sealed in the valving bore and a portion thereof extending into an enlarged bore with said screw rotatably connected thereto.

25. The system defined in claim 24, wherein the portion of the spool extending into an enlarged bore has a pair of spaced lands thereon for slidably guiding the spool.

26. A method of modulating refrigerant flow in an expansion valve comprising:
(a) providing a valve body and forming in the body a valving bore with an inlet and outlet communicating with the bore;
(b) disposing a spool in the valving bore and moveably sealing a first portion of the spool in the bore for controlling flow between the inlet and outlet and extending a second portion of the spool out of the valving bore;

(c) disposing a motor on the valve body and connecting the motor with a drive screw to the spool second portion;
(d) providing an electronic control unit (ECU) and providing a sensed refrigerant temperature signal to the ECU; and,
(e) connecting the ECU to said motor and rotating the drive screw and modulating said spool portion in the bore in response to the temperature signal.

27. The method defined in claim 26, where the step of connecting the motor with a drive screw includes connecting with a ball screw.

28. The method defined in claim 26, where the step of providing a sensed refrigerant temperature signal includes forming a separate sensing passage through the valve body, disposing a thermistor in the sensing passage and connecting the thermistor to the ECU.

* * * * *